(12) United States Patent
Kondo et al.

(10) Patent No.: US 8,349,455 B2
(45) Date of Patent: Jan. 8, 2013

(54) GLASS AND CHEMICALLY TEMPERED GLASS

(75) Inventors: Yuki Kondo, Chiyoda-ku (JP); Hiroyuki Ohkawa, Chiyoda-ku (JP); Makoto Sano, Chiyoda-ku (JP); Kazutaka Hayashi, Chiyoda-ku (JP); Shusaku Akiba, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 209 days.

(21) Appl. No.: 12/858,768

(22) Filed: Aug. 18, 2010

(65) Prior Publication Data

US 2011/0071012 A1 Mar. 24, 2011

(30) Foreign Application Priority Data

Sep. 18, 2009 (JP) ................................. 2009-217210
Dec. 16, 2009 (JP) ................................. 2009-285377

(51) Int. Cl.
*B32B 17/00* (2006.01)
*C03C 21/00* (2006.01)
*C03C 3/085* (2006.01)
*C03C 3/087* (2006.01)

(52) U.S. Cl. .............. 428/410; 501/68; 501/69; 501/70; 501/71

(58) Field of Classification Search .............. 501/68–71; 428/410
See application file for complete search history.

(56) References Cited

U.S. PATENT DOCUMENTS

| | | | | |
|---|---|---|---|---|
| 3,169,217 A * | 2/1965 | Dalton | ........................ | 257/702 |
| 3,287,200 A * | 11/1966 | Hess et al. | ................... | 428/410 |
| 3,904,425 A * | 9/1975 | Young et al. | .................... | 501/71 |
| 4,525,462 A * | 6/1985 | Behr | ............................... | 501/71 |
| 5,268,335 A * | 12/1993 | Kerko et al. | .................... | 501/66 |
| 5,650,365 A * | 7/1997 | Higby et al. | .................... | 501/71 |
| 5,837,629 A * | 11/1998 | Combes et al. | ................. | 501/70 |
| 5,998,316 A * | 12/1999 | Seto et al. | ..................... | 501/71 |
| 6,413,893 B1 * | 7/2002 | Shelestak et al. | ................ | 501/71 |
| 6,436,860 B2 * | 8/2002 | Seto et al. | ..................... | 501/71 |
| 6,780,803 B2 * | 8/2004 | Seto et al. | ..................... | 501/71 |
| 2004/0110624 A1 * | 6/2004 | Hulme et al. | ................... | 501/70 |
| 2005/0245385 A1 * | 11/2005 | Landa et al. | .................... | 501/70 |

FOREIGN PATENT DOCUMENTS

JP 45-16112 6/1970

OTHER PUBLICATIONS

Gy, "Ion Exchange for Glass Strengthening," Material Science and Engineering B, 149 (2008), pp. 159-165.*
D.J. Green, Encyclopedia of Materials, "Ceramics and Glasses, Tempering of: Residual Stresses," (2001) pp. 1095- 1097.*
Volf, Chemical Approach to Glass, (1984) pp. 347-349.*

* cited by examiner

*Primary Examiner* — David Sample
(74) *Attorney, Agent, or Firm* — Oblon, Spivak, McClelland, Maier & Neustadt, L.L.P.

(57) ABSTRACT

Glass comprising, as represented by mole percentage based on the following oxides, from 50 to 75% of $SiO_2$, from 1 to 15% of $Al_2O_3$, from 6 to 21% of $Na_2O$, from 0 to 15% of $K_2O$, from 0 to 15% of MgO, from 0 to 20% of CaO, from 0 to 21% of $\Sigma RO$ (wherein R is Mg, Ca, Sr, Ba and/or Zn), from 0 to 5% of $ZrO_2$, from 1.5 to 6% of $Fe_2O_3$, and from 0.1 to 1% of $Co_3O_4$.

13 Claims, No Drawings

GLASS AND CHEMICALLY TEMPERED GLASS

BACKGROUND OF THE INVENTION

1. Field of the Invention

The present invention relates to glass and chemically tempered glass to be used for operation panels of AV equipment, OA equipment, etc., doors of such products, operation buttons and knobs, accessories, etc.

2. Discussion of Background

Heretofore, for operation panels of AV equipment, OA equipment, etc., metallic panels of e.g. aluminum, or black panels have been heavily used. Particularly for AV equipment, etc., black panels have been heavily used, which are not highly noticeable so as not to disturb concentration on images or music when used, and which add a touch of class and expensive-looking.

For such black panels and operation buttons, knobs and the like thereof, usually a black resin or a metal component coated black has been used. However, with respect to a surface treated product e.g. by coating, the coated surface is likely to be damaged, and the coating may be removed with time. Further, with respect to a black resin which is a colored substrate itself, it is free from worry about removal, but the resin itself is likely to be damaged and in addition, its texture is cheap, and accordingly it is improper to a classy and elegant image required for high-grade products in some cases.

Further, the same applied to doors which conceal operation buttons of the above equipment. A metal should be colored in some way, and a resin is insufficient in rigidity and flatness and distortion of its surface will impair a touch of class and expensive-looking.

Accordingly, for some products, glass has been used as substrates of operation panels or doors. In a case where the substrate is made of glass, differently from a resin, it is hardly damaged, has sufficient rigidity, and provides a highly flat surface by polishing. However, commonly used glass is transparent, and accordingly it is used as a black panel by coating the rear side of a glass plate with an organic resin coating material or by coating it with a low-melting glass containing a black pigment, followed by firing. Glass the rear side of which is coated black provides surface reflection and rear-side reflection as observed from the non-coated side, and provides twinkling impressions.

On the other hand, in order not to cause such rear-side reflection, black glass having a colorant added to glass itself is used in some cases. Black glass, which does not provide the rear-side reflection, is likely to produce jet-black heavy impressions.

In a case where the opening of a metal casing or the like is covered with glass as a structural material or in a case where black glass is used for a door, it is required to increase the strength of the glass, although it is not necessary in a case where black glass is bonded to the front of the metal casing or the like for the purpose of decorating the operation panel.

As a method of increasing the strength of the glass, a means of forming a compressive stress layer on the glass surface is common.

As the means of forming a compressive stress layer on the glass surface, an air-cooling tempering method (thermal tempering method) of quenching the surface of a glass plate heated to the vicinity of its softening point by air-cooling or the like, and a chemical tempering method of replacing alkali metal ions (typically Li ions, Na ions) having a small ion radius on the surface of a glass plate with alkali ions (typically K ions) having a larger ion radius by ion exchange at a temperature of at most the glass transition point, are typically mentioned.

The above-described decorative glass is used usually in a thickness of at most 2 mm in many cases. If the air-cooling tempering method is applied to such a thin glass plate, it will be difficult to form a compressive stress layer since there is hardly a difference in the temperature between the surface and the interior, whereby the desired property of high strength will hardly be obtained. Further, by the air-cooling tempering, the flatness is likely to be impaired particularly with respect to a thin plate due to dispersion of the cooling temperature, whereby the texture which is the object of the present invention may be impaired. From such a viewpoint, the glass is preferably tempered by the latter chemical tempering method.

As glass which may be chemically tempered and which is black, glass disclosed in Patent Document 1 has been known. The glass disclosed in Patent Document 1 comprises aluminosilicate glass and a high concentration iron oxide incorporated therein.

Patent Document 1: JP-B-45-16112

In Examples disclosed in the above Patent Document 1, arsenious acid is used as a clarifying agent. Arsenious acid is a poisonous substance, and has harmful effect over the environment not only in the production step but also through the life cycle of a product is considered.

Accordingly, the present inventors have prepared and melted glass starting materials so as to achieve the glass composition as disclosed in Examples of Patent Document 1 without addition of arsenic acid, whereupon it was found that bubble removal i.e. defoaming properties were very poor, and only glass having a large number of remaining bubbles was obtained. That is, the molten glass was cast into a form of a block, which was sliced into a sheet, and its surface was polished, whereupon a large number of dents formed by cutting the bubbles in the glass (hereinafter referred to as open bubbles) were exposed on the polished surface.

For the above-described decorative application, since glass having such open bubbles cannot be used from the requirement in terms of the quality of the appearance, the product yield is extremely decreased. Further, the open bubbles may cause fracture, thus decreasing the strength.

SUMMARY OF THE INVENTION

It is an object of the present invention to provide glass which has properties suitable for the decorative application i.e. which has excellent bubble qualities and which is capable of being chemically tempered, and chemically tempered glass suitable for the decorative application.

The present invention provides glass (hereinafter sometimes referred to as glass of the present invention) comprising, as represented by mole percentage based on the following oxides, from 50 to 75% of $SiO_2$, from 1 to 15% of $Al_2O_3$, from 6 to 21% of $Na_2O$, from 0 to 15% of $K_2O$, from 0 to 15% of MgO, from 0 to 20% of CaO, from 0 to 21% of $\Sigma RO$ (wherein R is Mg, Ca, Sr, Ba and/or Zn), from 0 to 5% of $ZrO_2$, from 1.5 to 6% of $Fe_2O_3$, and from 0.1 to 1% of $Co_3O_4$.

The present invention further provides chemically tempered glass (hereinafter sometimes referred to as chemically tempered glass of the present invention) comprising, as represented by mole percentage based on the following oxides, from 50 to 75% of $SiO_2$, from 1 to 15% of $Al_2O_3$, from 6 to 21% of $Na_2O$, from 0 to 15% of $K_2O$, from 0 to 15% of MgO, from 0 to 20% of CaO, from 0 to 21% of $\Sigma RO$ (wherein R is Mg, Ca, Sr, Ba and/or Zn), from 0 to 5% of $ZrO_2$, from 1.5 to 6% of $Fe_2O_3$, and from 0.1 to 1% of $Co_3O_4$, and having a compressive stress layer of from 6 to 70 μm in a depth direction from the surface.

The present invention further provides the glass or the chemically tempered glass of the present invention, wherein the $Co_3O_4/Fe_2O_3$ ratio is from 0.01 to 0.5.

The present invention further provides the glass or the chemically tempered glass of the present invention, which contains from 0.005 to 0.5% of $SO_3$.

The present invention further provides the glass or the chemically tempered glass of the present invention, wherein the iron redox is from 10 to 50%.

The present invention further provides the glass or the chemically tempered glass of the present invention, which has a visible light transmittance of at most 30% at a thickness of 0.5 mm.

The present invention further provides the glass or the chemically tempered glass of the present invention, wherein when the transmittance at 600 nm is normalized to 1, the relative values of the 550 nm transmittance and the 450 nm transmittance are both at least 1.

The present invention still further provides the chemically tempered glass of the present invention, which has a maximum thickness of at most 2 mm.

According to the present invention, glass having favorable bubble quality can be stably obtained while decreasing the environmental burden. Further, glass suitable for clarification by a sulfate can be obtained.

Further, the glass of the present invention is capable of being chemically tempered, and is suitably used for an application for which a high strength even with a small thickness is required, for example, for the decorative application.

Further, the chemically tempered glass of the present invention is hardly broken by microcracking, and even if it is broken, it will hardly break into pieces and fly off, and is thereby excellent in the safety.

DETAILED DESCRIPTION OF THE PREFERRED EMBODIMENTS

Now, the composition of the glass of the present invention will be described with reference to contents as represented by mole percentage unless otherwise specified. Further, the chemically tempered glass of the present invention is one obtained by chemically tempering the glass of the present invention, and accordingly description of the glass composition of the chemically tempered glass of the present invention is omitted.

$SiO_2$ is a component to constitute the skeleton of glass and is essential. If its content is less than 50%, the stability of glass will be decreased, or the weather resistance will be decreased. The content is preferably at least 55%, more preferably at least 60%.

If the $SiO_2$ content exceeds 75%, the viscosity of glass will be increased, and the melting properties will be remarkably decreased. The content is preferably at most 70%, typically at most 68%.

$Al_2O_3$ is a component to improve the weather resistance of glass and is essential. If its content is less than 1%, the weather resistance will be decreased. The content is preferably at least 2%, typically at least 3%.

If the $Al_2O_3$ content exceeds 15%, the viscosity of the glass will be high, and homogeneous melting will be difficult. The content is preferably at most 11%, more preferably at most 8%, typically at most 7%.

$Na_2O$ is a component to improve the melting properties of glass, and is essential for forming a surface compressive stress layer by ion exchange. If its content is less than 6%, the melting properties will be poor, and it will be difficult to form a desired surface compressive stress layer by ion exchange. The content is preferably at least 7%, typically at least 8%.

If the $Na_2O$ content exceeds 21%, the weather resistance will be decreased. The content is preferably at most 20%, more preferably at most 15%, typically at most 13%.

$K_2O$ is a component to improve the melting properties and in addition, has an effect of increasing the ion exchange rate in the chemical tempering and thus is preferably contained in the present invention although not essential. In a case where $K_2O$ is contained, if its content is less than 1%, no significant effect of improving the melting properties may be obtained, or no significant effect of improving the ion exchange rate may be obtained. The content is typically at least 2%.

If the $K_2O$ content exceeds 15%, the weather resistance will be decreased. The content is preferably at most 10%, typically at most 5%.

MgO is a component to improve the melting properties and may be contained as the case requires although not essential. In a case where MgO is contained, if its content is less than 1%, no significant effect of improving the melting properties may be obtained. The content is typically at least 5%.

If the MgO content exceeds 15%, the weather resistance will be decreased. The content is preferably at most 13%, typically at most 12%.

CaO is a component to improve the melting properties and may be contained as the case requires. In a case where CaO is contained, if its content is less than 1%, no significant effect of improving the melting properties will be obtained. The content is typically at least 5%.

If the CaO content exceeds 20%, the weather resistance will be decreased. The content is preferably at most 15%, typically at most 10%.

RO (wherein R is Mg, Ca, Sr, Ba or Zn) is a component to improve the melting properties, and at least one of them may be contained as the case requires although not essential. In such a case, the total content ΣRO (wherein R is Mg, Ca, Sr, Ba and/or Zn) of RO, that is, the total content of MgO, CaO, SrO, BaO and ZnO, is preferably at least 1%. If the content is less than 1%, the melting properties may be decreased. The content is preferably at least 5%, typically at least 10%.

If ΣRO (wherein R is Mg, Ca, Sr, Ba and/or Zn) exceeds 21%, the weather resistance will be decreased. It is preferably at most 20%, more preferably at most 18%, typically at most 16%.

$ZrO_2$ is a component to increase the ion exchange rate and may be contained as the case requires although not essential. In a case where $ZrO_2$ is contained, if its content is less than 1%, no significant effect of improving the ion exchange rate will be obtained. The content is typically at least 2%.

If the $ZrO_2$ content exceeds 5%, the melting properties will be impaired, and $ZrO_2$ may remain in glass as an unmelted substance. The content is preferably at most 4%, typically at most 3%.

$Fe_2O_3$ is an essential component to color glass dark color. If the total iron content represented by $Fe_2O_3$ is less than 1.5%, no desired black glass will be obtained. It is preferably at least 2%, more preferably at least 3%.

If the total iron content represented by $Fe_2O_3$ exceeds 6%, glass will be unstable and devitrified. It is preferably at most 5%, more preferably at most 4%.

In the total iron content, the ratio (iron redox) of the content of bivalent iron as calculated as $Fe_2O_3$ is preferably from 10 to 50%, particularly preferably from 15 to 40%, most preferably from 20 to 30%. If the iron redox is lower than 10%, $SO_3$ if contained will not be decomposed, and no expected clarifying effect may be obtained. If it is higher than 50%, $SO_3$ may be too decomposed before clarification, and no expected clarifying effect will be obtained, or it will be a formation source of bubbles, thus increasing the number of bubbles.

$Co_3O_4$ has a defoaming effect in coexistence with iron and is essential in the present invention. That is, $O_2$ bubbles discharged when trivalent iron is converted to bivalent iron at high temperature state, are absorbed when cobalt is oxidized, and resultantly the $O_2$ bubbles are reduced, and a defoaming effect is obtained.

Further, $Co_3O_4$ is a component to further increase the clarifying effect in coexistence with $SO_3$. That is, for example, in a case where Glauber's salt ($Na_2SO_4$) is used as a clarifying agent, the bubbles are well removed by facilitating the progress of reaction of $SO_3 \rightarrow SO_2 + \frac{1}{2}O_2$, and accordingly the oxygen partial pressure in glass is preferably low. By adding cobalt to glass containing iron, discharge of oxygen by reduction of iron is suppressed by oxidation of cobalt, whereby decomposition of $SO_3$ is accelerated, and glass having few bubbles will be prepared.

Further, glass containing a relative large amount of alkali metals for chemical tempering has high basicity, whereby $SO_3$ is hardly decomposed, and the clarifying effect will be decreased. In glass for chemical tempering in which $SO_3$ is hardly decomposed, and which contains iron, cobalt accelerates decomposition of $SO_3$ and is particularly effective.

In order to achieve such a clarifying effect, the $Co_3O_4$ content is at least 1%, preferably at least 0.2%, typically at least 0.3%. If the content exceeds 1%, glass will be unstable and devitrified. The content is preferably at most 0.8%, more preferably at most 0.6%.

If the molar ratio of $Co_3O_4$ to $Fe_2O_3$ i.e. the $Co_3O_4/Fe_2O_3$ ratio is less than 0.01, the above effect may not be obtained. The ratio is preferably at least 0.05, typically at least 0.1. If the $Co_3O_4/Fe_2O_3$ ratio exceeds 0.5, bubbles will rather be formed, and melting of glass will be slow, or the number of bubbles may be increased. The ratio is preferably at most 0.3, more preferably at most 0.2.

$SO_3$ is a component to function as a clarifying agent although not essential. In a case where $SO_3$ is contained, if its content is less than 0.005%, no expected clarifying effect will be obtained. The content is preferably at least 0.01%, more preferably at least 0.02%, most preferably at least 0.03%. Further, if the content exceeds 0.5%, bubbles will rather be formed, and melting of glass will be slow, or the number of bubbles may be increased. The content is preferably at most 0.3%, more preferably at most 0.2%, most preferably at most 0.1%.

$Li_2O$ is a component to improve the melting properties and may be contained as the requires although not essential. In a case where $Li_2O$ is contained, if its content is less than 1%, no significant effect of improving the melting properties may be obtained. The content is preferably at least 3%, typically at least 6%.

If the $Li_2O$ content exceeds 15%, the weather resistance may be decreased. The content is preferably at most 10%, typically at most 5%.

SrO is a component to improve the melting properties and may be contained as the case requires although not essential. In a case where SrO is contained, if its content is less than 1%, no significant effect of improving the melting properties may be obtained. The content is preferably at least 3%, typically at least 6%.

If the SrO content exceeds 15%, the weather resistance may be decreased. The content is preferably at most 12%, typically at most 9%.

BaO is a component to improve the melting properties and may be contained as the case requires although not essential. In a case where BaO is contained, if its content is less than 1%, no significant effect of improving the melting properties may be obtained. The content is preferably at least 3%, typically at least 6%.

If the BaO content exceeds 15%, the weather resistance may be decreased. The content is preferably at most 12%, typically at most 9%.

ZnO is a component to improve the melting properties and may be contained as the case requires although not essential. In a case where ZnO is contained, if its content is less than 1%, no significant effect of improving the melting properties may be obtained. The content is preferably at least 3%, typically at least 6%.

If the ZnO content exceeds 15%, the weather resistance may be decreased. The content is preferably at most 12%, typically at most 9%.

$B_2O_3$ is a component to improve the weather resistance and may be contained as the case requires although not essential. In a case where $B_2O_3$ is contained, if its content is less than 1%, no significant effect of improving the weather resistance may be obtained. The content is preferably at least 3%, typically at least 6%.

If the $B_2O_3$ content exceeds 15%, striae by sublimation may form, thus decreasing the yield. The content is preferably at most 12%, typically at most 9%.

$TiO_2$ is a component to improve the weather resistance and may be contained as the case requires although not essential. In a case where $TiO_2$ is contained, if its content is less than 1%, no significant effect of improving the weather resistance may be obtained. The content is preferably at least 3%, typically at least 5%.

If the $TiO_2$ content exceeds 12%, the glass may be unstable and devitrified. The content is preferably at most 10%, typically at most 8%.

The coloring component of the glass of the present invention is essentially iron, and within a range not to impair the object of the present invention, $V_2O_5$, CrO, MnO, CuO, $MoO_3$, $CeO_2$ and other components may be contained. If such components are contained, the total content of such components is preferably at most 3%, typically at most 1%.

The clarifying agent of the glass of the present invention is essentially CO, $SO_3$ may be used as the case requires, and within a range not to impair the object of the present invention, $Sb_2O_3$, SnO, Cl, F and other components may be contained. In a case where such components are contained, the total content of such components is preferably at most 1%, typically at most 0.5%.

The glass of the present invention typically comprises from 50 to 75% of $SiO_2$, from 1 to 15% of $Al_2O_3$, from 6 to 20% of $Na_2O$, from 0 to 15% of $K_2O$, from 0 to 15% of MgO, from 0 to 20% of CaO, from 0 to 20% of $\Sigma RO$ (wherein R is Mg, Ca, Sr, Ba and/or Zn), from 0 to 5% $ZrO_2$, from 1.5 to 6% of $Fe_2O_3$, from 0.1 to 1% of $Co_3O_4$ and from 0.005 to 0.5% of $SO_3$.

The process for producing the glass of the present invention is not particularly limited. For example, the glass is produced in such a manner that appropriate amounts of various starting materials are prepared and heated to about 1,500 to about 1,600° C. and melted, the melt is homogenized by defoaming, stirring or the like, and formed into a plate by a known down draw method, pressing method or the like, or cast to be formed into a block, followed by annealing, and the plate or the block is cut into a desired size, followed by polishing as the case requires.

The chemical tempering method is not particularly limited so long as Na$_2$O on the glass plate surface layer and K$_2$O in the molten salt can be ion-exchanged, and for example, a method of immersing a glass plate into a heated potassium nitrate (KNO$_3$) molten salt may be mentioned.

Conditions for formation of a chemically tempered layer (surface compressive stress layer) having a desired surface compressive stress on a glass plate vary depending upon the thickness of the glass plate, and typically, a glass substrate is immersed in a KNO$_3$ molten salt at 400 to 550° C. for from 2 to 20 hours.

The chemically tempered glass of the present invention can be produced by applying the above chemical tempering method to the glass of the present invention formed into a desired shape by the above production process. On that occasion, the thickness of the surface compressive stress layer formed by chemical tempering is considered to be from 6 to 70 μm, from the following reasons.

In production of glass to be used for the decorative application, usually glass is polished. The particle size of abrasive grains to be used for polishing at the final stage is typically from 2 to 6 μm, and it is considered that microcrackings of at most 5 μm are finally formed on the glass surface by such abrasive grains. In order to achieve an effect of improving the strength by chemical tempering, a surface compressive stress layer which is deeper than the microcrackings formed on the glass surface is required, and accordingly the thickness of the surface compressive stress layer formed by chemical tempering is considered to be at least 6 μm. Further, if the glass surface gets a scar which is deeper than the thickness of the surface compressive stress layer at the time of use, it may lead to breakage of glass, and accordingly the surface compressive stress layer is preferably thick, more preferably at least 10 μm, furthermore preferably at least 20 μm, typically at least 30 μm.

On the other hand, if the surface compressive stress layer is deep, the internal tensile stress is great, and impact at the time of breakage will be great. That is, if the internal tensile stress is great, the glass tends to break into pieces and fly off when broken, such being dangerous. As a result of experiments by the present inventors, in the case of glass having a thickness of at most 2 mm, if the depth of the surface compressive stress layer exceeds 70 μm, flying when glass is broken tends to be remarkable. Accordingly, in the chemically tempered glass of the present invention, the thickness of the surface compressive stress layer is at most 70 μm. In a case where the glass is used as decorative glass, depending on its application, for example, for application to e.g. portable equipment which is highly likely to have scars on its surface by contact as compared with installation type equipment such as an operation panel of AV equipment, OA equipment, etc., it is considered to make the surface compressive stress layer thin for safety's sake, and the thickness is more preferably at most 60 μm, furthermore preferably at most 50 μm, typically at most 40 μm.

EXAMPLES

Now, the present invention will be described in further detail with reference to Examples. However, it should be understood that the present invention is by no means restricted to such specific Examples.

In Examples 1 to 12 (Examples 1 to 9 are Examples of the present invention and Examples 10 to 12 are Comparative Examples) in Tables 1 and 2, commonly used glass starting materials such as oxides, hydroxides, carbonates and nitrates were properly selected so as to have compositions as shown in Tables as represented by mole percentage, weighed to obtain 100 ml of glass, and in addition, in Examples 1 to 8 as Examples of the present invention and in Example 10 as a Comparative Example, Glauber's salt (Na$_2$SO$_4$) was also added, and the starting materials were mixed. Values shown in the column of SO$_3$ in Tables represent the amount of remaining SO$_3$ which remained in glass after Glauber's salt was decomposed and are values evaluated by compositional analysis, and values with * represent the remaining SO$_3$ amount estimated by the amount of addition of Glauber's salt. Further, Co/Fe in Tables represents the above-described Co$_3$O$_4$/Fe$_2$O$_3$ ratio.

Further, Example 8 corresponds to one having 0.9% by outer percentage of Co$_3$O$_4$ added to the composition in Example 10, and Example 9 corresponds to one having 0.9% by outer percentage of Co$_3$O$_4$ added to the composition in Example 11.

Then, the starting material mixture was put in a platinum crucible, the platinum crucible was put in a resistance heat type electric furnace at 1,550° C. After the starting materials were melted down in about 0.5 hour, the mixture was melted for one hour, refined and cast in a mold of about 50 mm×about 100 mm×about 20 mm in height preliminarily heated at about 300° C., and annealed at a rate of about 1° C./min to obtain a glass block. The glass block was cut into a size of 40 mm×40 mm×0.5 mm in thickness and polished, and finally both surfaces were mirror polished to obtain a plate form glass.

In Examples 13 to 15 in Table 3 which are Examples of the present invention, preparation of such a plate form glass was not carried out.

With respect to the obtained plate form glass, the iron redox (unit: %), the number of bubbles (unit: bubbles/cm$^{-3}$), and the ratios T$_{550}$' and T$_{450}$' of the transmittances at wavelengths of 550 nm and 450 nm to the transmittance at a wavelength of 600 nm, were measured, and the results are shown in Tables 1 and 2. Values with * in Tables are estimated values or calculated values.

With respect to the iron redox, the ratio of bivalent iron as calculated as Fe$_2$O$_3$ in the total iron as calculated as Fe$_2$O$_3$ by means of Mössbauer spectroscopy was represented by %. Specifically, evaluation was carried out in a transmission optical system in which a radiation source ($^{57}$Co), a glass sample (a glass plate having a thickness of from 3 to 7 mm, which was cut from the above glass block, polished and mirror polished) and a detector (45431, manufactured by LND, INC.) were disposed on a straight line. The radiation source was moved relative to the axial direction of the optical system, and the energy change of γ rays by Doppler effect was caused. Using the Mössbauer absorption spectrum obtain at room temperature, the ratios of bivalent Fe and trivalent Fe were calculated, and the ratio of bivalent Fe was regarded as the iron redox.

With respect to the number of bubbles, under a high brightness light source (LA-100T, manufactured by HAYASHI WATCH-WORKS CO., LTD.), the number of bubbles in a region of 0.05 cm$^3$ in the above plate form glass was measured at four positions, and the average of the measured values was multiplied by 20 to obtain a value calculated per unit volume.

With respect to the transmittance, each sample of the above plate form glass was subjected to spectrometry using an ultraviolet/visible/near infrared spectrophotometer (manufactured by PerkinElmer, tradename: LAMBDA 950), and the 550 nm transmittance and the 450 nm transmittance as relative values when the transmittance at 600 nm was normalized to 1, were shown. Further, the visible light transmittance at a thickness of 0.5 mm under illuminant A measured in accordance with JIS R3106 was represented as Tva (unit: %).

As a result, it is found that the iron redox of the glass in each of Examples of the present invention is within a range of from 10 to 50% suitable for decomposition of $SO_3$ from the results by Mössbauer spectroscopy.

With respect to the number of bubbles, as compared with Examples 11 and 12 (Comparative Examples) in which neither Glauber's salt ($Na_2SO_4$) or $Co_3O_4$ was added, the number of bubbles is small in Example 10 (Comparative Example) in which Glauber's salt ($Na_2SO_4$) was added, but the number of bubbles is further smaller in Example 9 which is an Example of the present invention in which no Glauber's salt ($Na_2SO_4$) was added but $Co_3O_4$ was added, and the number of bubbles tends to be further reduced in the glass in each of Examples 1 to 8 (Examples of the present invention) in which both Glauber's salt ($Na_2SO_4$) and $Co_3O_4$ were added. Thus, by coexistence of $SO_3$ and Co, glass having improved clarity and more excellent bubble quality can be obtained.

In the above Examples, to confirm effects of Glauber's salt ($Na_2SO_4$) and $Co_3O_4$, the test was carried out at constant melting temperature and melting time. However, the number of bubbles can further be reduced by increasing the melting temperature or prolonging the melting time. For the above application (operation panels of AV equipment, OA equipment, etc., doors of such products, operation buttons and knobs), considering the yield at the time of mass production, the number of bubbles larger than 100 μm is preferably at most one bubble/$cm^3$, more preferably at most 0.5 bubble/$cm^3$.

From the results of the above evaluation of the transmittance, as represented by the visible light transmittance Tva at a thickness of 0.5 mm under illuminant A, it is found that the glass of the present invention is black as different from privacy glass for automobiles. The visible light transmittance Tva of typical privacy glass under illuminant A is about 10% at a thickness of from 4 to 5 mm. In the present invention, the visible light transmittance Tva at a thickness of 0.5 mm is preferably at most 30%, more preferably at most 10%, furthermore preferably at most 5%, most preferably at most 1%.

Further, from the results of the above evaluation of the transmittance, in the glass in each of Examples 10 to 12 as Comparative Examples in which only $Fe_2O_3$ was contained as a coloring agent, the 600 nm transmittance is very high relative to the transmittances at 450 nm and 550 nm, whereby the glass looks brown, which causes a decrease in the yield for the decorative application for which a jet-black color tone is required. Whereas in the glass in each of Examples 1 to 9 as Examples of the present invention in which $Co_3O_4$ was added, the transmittances at 450 nm and 550 nm are high relative to the 600 nm transmittance, and thus the glass has a jet-black color tone. In order to control the color tone of glass to black which looks jet-black, $Co_3O_4$ is contained preferably in an amount of at least 0.1%.

Assuming the above application (operation panels of AV equipment, OA equipment, etc., doors of such products, operation buttons and knobs), in order that the glass is black which does not look other color when observed in a state where there is no light source on the rear side of the glass, i.e. only by reflected light, as described above, it is preferred that the visible light transmittance Tva at a thickness of 0.5 mm is at most 30% and that the relative values $T_{550}'$ and $T_{450}'$ of the 550 nm transmittance and the 450 nm transmittance when the transmittance at 600 nm is normalized to 1 are both at least 1. Such glass can reproduce a quiet jet-black color tone even when irradiated with light from the front or from the side.

Chemical tempering treatment of such glass is carried out, for example, as follows. That is, such glass is immersed in a $KNO_3$ molten salt at 450° C. for 6 hours to carry out chemical tempering treatment. Each glass is subjected to potassium concentration analysis in a depth direction, whereupon ion exchange occurs in a depth of from 50 to 100 μm from its surface, whereby a compressive stress layer is formed.

The glass in each of Examples 1 to 5, 8, 11 and 12 was subjected to chemical tempering treatment as follows. That is, each glass was subjected to chemical tempering treatment by being immersed in a $KNO_3$ molten salt at 450° C. for 6 hours. Each glass after the chemical tempering treatment was subjected to the potassium concentration analysis in a depth direction using EPMA, and the results are shown in Tables 1 and 2 as the depth t (unit: μm) of the surface compressive stress layer. Further, estimated values of t are shown with respect to Examples 6, 7, 9, 10, and 13 to 15.

As shown in Tables, a desired depth of the surface compressive stress layer is obtained under the above chemical tempering treatment conditions, and from the results, it is considered that a necessary and sufficient effect of improving the strength is obtained.

Further, with respect to the glass in Example 3, the depths of the surface compressive stress layer were measured in the same manner as above by changing the chemical tempering treatment conditions, that is, by changing the $KNO_3$ molten salt concentration to 100% or 99%, the $KNO_3$ molten salt temperature to 400° C., 425° C. or 450° C., and the immersion time in the molten salt to 4 hours, 6 hours or 8 hours. The results are shown in Table 4. With the glass of the present invention, it is possible to obtain a desired depth of the surface compressive stress layer by changing such chemical tempering conditions.

Further, with respect to each glass after the chemical tempering treatment, in the same manner as above, the iron redox (unit: %), the ratios $T_{550}'$ and $T_{450}'$ of the transmittances at wavelengths of 550 nm and 450 nm to the transmittance at a wavelength of 600 nm, and the visible light transmittance Tva (unit: %) at a thickness of 0.5 mm under illuminant A measured in accordance with JIS R3106, were measured, and it was confirmed that these values were not changed from the values before the chemical tempering. Further, it was confirmed that the visually observed color tone was not changed.

Accordingly, the glass of the present invention can be used for application for which strength is required by chemical tempering without impairing the desired color tone, and its application range can be broadened to the decorative application.

TABLE 1

|  | Ex. 1 | Ex. 2 | Ex. 3 | Ex. 4 | Ex. 5 | Ex. 6 |
|---|---|---|---|---|---|---|
| $SiO_2$ | 62.1 | 62.0 | 61.9 | 67.6 | 65.6 | 55.0 |
| $Al_2O_3$ | 5.8 | 5.8 | 5.8 | 1.0 | 10.8 | 3.0 |
| $ZrO_2$ | 2.4 | 2.4 | 2.4 | 0 | 0 | 0 |
| MgO | 10.6 | 10.6 | 10.6 | 5.4 | 6.0 | 7.0 |
| CaO | 0 | 0 | 0 | 8.6 | 0.6 | 8.0 |
| $Na_2O$ | 11.6 | 11.7 | 11.9 | 12.0 | 12.9 | 6.5 |

TABLE 1-continued

|  | Ex. 1 | Ex. 2 | Ex. 3 | Ex. 4 | Ex. 5 | Ex. 6 |
|---|---|---|---|---|---|---|
| $K_2O$ | 3.9 | 3.8 | 3.8 | 0.3 | 2.4 | 14.0 |
| $Fe_2O_3$ | 3.2 | 3.2 | 3.2 | 4.9 | 1.6 | 5.5 |
| $Co_3O_4$ | 0.39 | 0.38 | 0.38 | 0.22 | 0.10 | 1.00 |
| $TiO_2$ | 0 | 0 | 0 | 0 | 0 | 0 |
| ΣRO | 10.6 | 10.6 | 10.6 | 14.0 | 6.6 | 15.0 |
| Co/Fe | 0.12 | 0.12 | 0.12 | 0.045 | 0.063 | 0.18 |
| $SO_3$ | 0.04 | 0.05 | 0.06 | 0.08 | 0.02 | 0.01* |
| Iron redox | 20 | 21 | 21 | 22 | 28 | 20* |
| Number of bubbles | 200 | 120 | 140 | 40 | 340 | 100* |
| Tva | 0.2 | 0.2 | 0.3 | 0.3 | 25 | 0.01* |
| $T_{550}'$ | 16 | 20 | 16 | 5 | 2 | 10000* |
| $T_{450}'$ | 17 | 18 | 19 | 3 | 2 | 2000000* |
| t | 32 | 36 | 36 | 9 | 51 | 40* |

TABLE 2

|  | Ex. 7 | Ex. 8 | Ex. 9 | Ex. 10 | Ex. 11 | Ex. 12 |
|---|---|---|---|---|---|---|
| $SiO_2$ | 70.1 | 58.7 | 58.7 | 59.2 | 59.2 | 58.8 |
| $Al_2O_3$ | 2.0 | 9.8 | 9.8 | 9.9 | 9.9 | 9.4 |
| $ZrO_2$ | 0 | 0 | 0 | 0 | 0 | 0.3 |
| MgO | 8.8 | 0 | 0 | 0 | 0 | 6.0 |
| CaO | 0 | 0 | 0 | 0 | 0 | 0 |
| $Na_2O$ | 14.5 | 19.5 | 19.5 | 19.7 | 19.7 | 20.3 |
| $K_2O$ | 2.0 | 0 | 0 | 0 | 0 | 0 |
| $Fe_2O_3$ | 2.0 | 3.3 | 3.3 | 3.3 | 3.3 | 5.2 |
| $Co_3O_4$ | 0.60 | 0.89 | 0.89 | 0 | 0 | 0 |
| $TiO_2$ | 0 | 7.8 | 7.8 | 7.9 | 7.9 | 0 |
| ΣRO | 8.8 | 0 | 0 | 0 | 0 | 6.0 |
| Co/Fe | 0.30 | 0.27 | 0.27 | 0 | 0 | 0 |
| $SO_3$ | 0.03* | 0.03* | 0 | 0.03* | 0 | 0 |
| Iron redox | 30* | 30* | 30* | 30* | 20 | 15 |
| Number of bubbles | 300* | 120 | 300 | 1040 | 3840 | 2080 |
| Tva | 0.1* | 0.02* | 0.02* | 4 | 6 | 2 |
| $T_{550}'$ | 300* | 4000* | 4000* | 0.4 | 0.4 | 0.5 |
| $T_{450}'$ | 10000* | 900000* | 900000* | 0.004 | 0.007 | 0.003 |
| t | 40* | 37 | 40* | 40* | 39 | 46 |

TABLE 3

|  | Ex. 13 | Ex. 14 | Ex. 15 |
|---|---|---|---|
| $SiO_2$ | 61.9 | 61.9 | 61.9 |
| $Al_2O_3$ | 5.8 | 5.8 | 5.8 |
| $ZrO_2$ | 2.4 | 2.4 | 2.4 |
| MgO | 0 | 0 | 0 |
| CaO | 0 | 0 | 0 |
| SrO | 10.6 | 0 | 0 |
| BaO | 0 | 10.6 | 0 |
| ZnO | 0 | 0 | 10.6 |
| $Na_2O$ | 11.9 | 11.9 | 11.9 |
| $K_2O$ | 3.8 | 3.8 | 3.8 |
| $Fe_2O_3$ | 3.2 | 3.2 | 3.2 |
| $Co_3O_4$ | 0.38 | 0.38 | 0.38 |
| $TiO_2$ | 0 | 0 | 0 |
| ΣRO | 10.6 | 10.6 | 10.6 |
| Co/Fe | 0.12 | 0.12 | 0.12 |
| $SO_3$ | 0.06* | 0.06* | 0.06* |
| Iron redox | 21* | 21* | 21* |
| Number of bubbles | 140* | 140* | 140* |
| Tva | 0.3* | 0.3* | 0.3* |
| $T_{550}'$ | 16* | 16* | 16* |
| $T_{450}'$ | 19* | 19* | 19* |
| t | 36* | 36* | 36* |

TABLE 4

| $KNO_3$ concentration (%) | $KNO_3$ temperature (° C.) | Immersion time (hr) | T (μm) |
|---|---|---|---|
| 100 | 400 | 4 | 15 |
| 100 | 400 | 6 | 19 |
| 100 | 400 | 8 | 22 |
| 100 | 425 | 4 | 22 |
| 100 | 425 | 6 | 24 |
| 100 | 425 | 8 | 28 |
| 100 | 450 | 4 | 28 |
| 100 | 450 | 6 | 36 |
| 100 | 450 | 8 | 39 |
| 99 | 400 | 4 | 16 |
| 99 | 400 | 6 | 21 |
| 99 | 400 | 8 | 25 |
| 99 | 425 | 4 | 20 |
| 99 | 425 | 6 | 26 |
| 99 | 425 | 8 | 30 |
| 99 | 450 | 4 | 28 |
| 99 | 450 | 6 | 34 |
| 99 | 450 | 8 | 35 |

The glass and the chemically tempered glass of the present invention are applicable to operation panels of AV equipment, OA equipment, etc., doors of such products, operation buttons and knobs, and accessories such as decorative panels disposed around the periphery of rectangular display screens of image display panels of e.g. digital photo frames and TVs.

The entire disclosures of Japanese Patent Application No. 2009-217210 filed on Sep. 18, 2009 and Japanese Patent Application No. 2009-285377 filed on Dec. 16, 2009 including specifications, claims and summaries are incorporated herein by reference in their entireties.

What is claimed is:

1. Chemically tempered glass comprising, as represented by mole percentage based on the following oxides, from 50 to 75% of $SiO_2$, from 1 to 15% of $Al_2O_3$, from 6 to 21% of $Na_2O$, from 0 to 15% of $K_2O$, from 0 to 15% of MgO, from 0 to 20% of CaO, from 0 to 21% of ΣRO (wherein R is Mg, Ca, Sr, Ba and/or Zn), from 0 to 5% of $ZrO_2$, from 1.5 to 6% of $Fe_2O_3$, and from 0.1 to 1% of $Co_3O_4$, and having a compressive stress layer of from 6 to 70 μm in a depth direction from the surface.

2. The chemically tempered glass according to claim 1, which comprises from 0 to 15% of SrO, from 0 to 15% of BaO, or from 0 to 15% of ZnO.

3. The chemically tempered glass according to claim 1, wherein the $Co_3O_4/Fe_2O_3$ ratio is from 0.01 to 0.5.

4. The chemically tempered glass according to claim 1, which comprises from 0.005 to 0.5% of $SO_3$.

5. The chemically tempered glass according to claim 1, wherein the iron redox is from 10 to 50%.

6. The chemically tempered glass according to claim 1, which has a visible light transmittance of at most 30% at a thickness of 0.5 mm.

7. The chemically tempered glass according to claim 1, wherein when the transmittance at 600 nm is normalized to 1, the relative values of the transmittance at 550 nm and the transmittance at 450 nm are both at least 1.

8. The chemically tempered glass according to claim 1, which has a maximum thickness of at most 2 mm.

9. The chemically tempered glass according to claim 1, which comprises from 3 to 12% of SrO.

10. The chemically tempered glass according to claim 1, which comprises from 3 to 12% of BaO.

11. The chemically tempered glass according to claim 1, which comprises from 3 to 12% of ZnO.

12. The chemically tempered glass according to claim 1, which comprises from 1 to 21% of ΣRO.

13. The chemically tempered glass according to claim 1, which comprises from 5 to 16% of ΣRO.

* * * * *